United States Patent
Park et al.

(10) Patent No.: US 9,444,322 B2
(45) Date of Patent: Sep. 13, 2016

(54) METHOD FOR SUPPRESSING CIRCULATING CURRENT IN MODULAR MULTILEVEL CONVERTER FOR HIGH VOLTAGE DIRECT-CURRENT TRANSMISSION

(71) Applicant: Korea Electrotechnology Research Institute, Gyeongsangnam-do (KR)

(72) Inventors: Jung Woo Park, Gyeongsangnam-do (KR); Dae Wook Kang, Gyeongsangnam-do (KR); Jong Hyun Kim, Gyeongsangnam-do (KR); Dong Wook Yoo, Gyeongsangnam-do (KR); Ji Woo Moon, Busan (KR); Jin Soo Kwon, Gyeongsangnam-do (KR); Chun Sung Kim, Gyeongsangnam-do (KR); Deuk Woo Bae, Gyeongsangnam-do (KR)

(73) Assignee: Korea Electrotechnology Research Institute, Gyeongsangnam-Do (KR)

(*) Notice: Subject to any disclaimer, the term of this patent is extended or adjusted under 35 U.S.C. 154(b) by 98 days.

(21) Appl. No.: 14/063,698

(22) Filed: Oct. 25, 2013

(65) Prior Publication Data
US 2014/0226373 A1   Aug. 14, 2014

(30) Foreign Application Priority Data
Feb. 13, 2013 (KR) .................. 10-2013-0015280

(51) Int. Cl.
*H02M 1/12* (2006.01)
*H02M 1/15* (2006.01)
(Continued)

(52) U.S. Cl.
CPC ............... *H02M 1/12* (2013.01); *H02M 1/15* (2013.01); *H02M 7/483* (2013.01); *H02J 3/36* (2013.01); *H02M 5/4585* (2013.01); *H02M 2007/4835* (2013.01); *Y02E 60/60* (2013.01)

(58) Field of Classification Search
CPC ........ H02M 1/12; H02M 1/13; H02M 5/458; H02M 5/4585; H02M 7/44; H02M 7/483; H02M 7/757; H02M 7/7575; H02M 2001/0003; H02M 2007/4835; H02J 3/01; H02J 3/1857; Y02E 40/46; Y02E 40/40; Y02E 40/26
USPC ........... 363/35, 37, 39, 40, 44, 65, 123, 125, 363/127, 131, 132; 323/207; 307/51, 151
See application file for complete search history.

(56) References Cited

U.S. PATENT DOCUMENTS 7,960,871 B2 * 6/2011 Dommaschk et al. ....... 307/151

OTHER PUBLICATIONS

"Reduced Switching-Frequency Modulation and Circulating Current Suppression for Modular Multilevel Converters", Q. Tu, Z. Xu, and L. Xu, IEEE Transactions on Power Delivery, vol. 26, No. 3, Jul. 2011, pp. 2009-2017.*

(Continued)

*Primary Examiner* — Adolf Berhane
*Assistant Examiner* — Jye-June Lee
(74) *Attorney, Agent, or Firm* — Frommer Lawrence & Haug LLP

(57) ABSTRACT

Provided is a method for suppressing a circulating current in a modular multi-level converter for a high voltage direction-current (HVDC) transmission system. The HVDC transmission system converts an alternating current (AC) into a direct current (DC) and vice versa, transmits energy using a DC cable, and including a modular multilevel converter generating a high voltage source by stacking a plurality of sub-modules in series. In the circulating current suppression method, a circulating current ($i_{diffj}$; j=a,b,c) of a,b,c phase in an abc 3-phase stationary reference frame, a DC current ($i_{dc}$) flowing in a DC cable, a current reference value ($i^*_{dc}$) of a DC component that needs to flow in the DC cable are inputted. The circulating current ($i_{diffj}$) of the a,b,c phase is controlled to become zero. A compensation value ($V^*_{diffj}$) for suppressing a harmonic component of the circulating current is outputted.

8 Claims, 10 Drawing Sheets

(51) Int. Cl.
*H02M 7/483* (2007.01)
*H02M 5/458* (2006.01)
*H02J 3/36* (2006.01)

(56) References Cited

OTHER PUBLICATIONS

"Control and Performance of a Modular Multilevel Converter System", W. Li, L. Gregoire, J. Belanger, OPAL-RT Technologies, CIGRE Canada Conference on Power Systems, Halifax, Sep. 6-8, 2011.*

X. She, A. Huang, X. Ni, and R. Burgos, "AC circulating currents suppression in modular multilevel converter," in Proc. IECON 2012—38th Annual Conf. on IEEE Industrial Electronics Society, 2012.*

Yang, Xiaofeng, et al. "Circulating current model of modular multilevel converter." Power and Energy Engineering Conference (APPEEC), 2011 Asia-Pacific. IEEE, 2011.*

Li, Zixin, et al. "An inner current suppressing method for modular multilevel converters." Power Electronics, IEEE Transactions on 28.11 (2013): 4873-4879.*

Ilves, Kalle, et al. "Circulating current control in modular multilevel converters with fundamental switching frequency." Power Electronics and Motion Control Conference (IPEMC), 2012 7th International. vol. 1. IEEE, 2012.*

Tu, Qingrui et al,: "Suppressing DC Voltage Ripples of MMC-HVDC Under Unbalanced Grid Conditions, *IEEE Transactions on Power Delivery*", vol. 27, No. 3, Jul. 2012, pp. 1332-1338.

Picas, R. et al.: "Minimization of the Capacitor Voltage Fluctuations of a Modular Multilevel Converter by Circulating Current Control", IECON 2012—38$^{th}$ Annual Conference of IEEE Industrial Electronics Society. Year: 2012, pp. 4985-4991, DOI: 10.1109/IECON. 2012.6388984 [IEEE-online].

Official action from the German Patent and Trademark Office for corresponding German application 10 2013 110 685.4 dated Dec. 10, 2015 with English translation.

* cited by examiner (a) Half bridge type Sub-module (b) Full bridge type Sub-module (c) Clamp Double type Sub-module

METHOD FOR SUPPRESSING CIRCULATING CURRENT IN MODULAR MULTILEVEL CONVERTER FOR HIGH VOLTAGE DIRECT-CURRENT TRANSMISSION

CROSS-REFERENCE TO RELATED APPLICATION

This application claims under 35 U.S.C. §119(a) the benefit of Korean Patent Application No. 10-2013-0015280 filed Feb. 13, 2013, the entire contents of which are incorporated herein by reference.

BACKGROUND (a) Technical Field

The present invention relates to a method for suppressing a circulating current in a modular multi-level converter for high voltage direction-current transmission. More specifically, it relates to a method for suppressing a circulating current in a modular multi-level converter for high voltage direction-current transmission, which can further improve a current flowing in a direct current line end while further improving the circulating current suppression characteristics.

(b) Background Art

Generally, the High Voltage Direct-Current (HVDC) transmission has advantages such as the long distance transmission, the asynchronous system connection, the submarine cable use, and the possible power control compared to the High Voltage Alternating-Current (HVAC) transmission, and thus the application cases of HVDC are steadily increasing.

For example, it is known that the HVDC system has lower energy transportation cost than the HVAC for the cases where a see is placed between an energy production location and an energy consumption location or where the distance between the energy production location and the energy consumption location is over 1,000 km Thus, as the commercialization magnitude is becoming larger about the marine wind power generation, one of the new renewable energy sources and the long-term plans to develop in a large quantity are released, HVDC technologies that are cheap, flexible and stable for transmitting power generated in a marine place to a terrestrial place are drawing attention.

Besides these reasons, the HVDC technologies have been studied for various purposes such as international energy transaction (electric power transaction), energy transaction between different electric power systems having different electric power system frequencies, installation of additional lines at a low cost when energy bottleneck phenomenon occurs due to the extensive energy consumption in downtowns that are densely populated areas.

The HVDC converter is a device that is a core of the HVDC system and is roughly divided into a current type converter and a voltage type converter. The present invention relates to a voltage type converter, and more particularly, to an HVDC converter with a "modular multi-level converter" among the voltage type converter, in which sub-modules (SM) are stacked in series to endure a high voltage.

FIG. 1 is a view illustrating an overall configuration of an HVDC system with a Modular Multilevel Converter (MMC). The Modular Multilevel Converters (MMC-1 and MMC-2) 3 and 4 that constitute the High Voltage Direct Current (HVDC) system transmit energy by the following process. A frequency and a voltage are applied to two different high voltage AC systems 1 and 2 to convert AC energy of one high voltage AC system 1 into DC energy, transmit the DC energy up to a long distance using a DC cable, and then re-convert the arrived DC energy into AC energy having a voltage and a frequency that are suitable for the other high voltage AC system 2.

The modular multilevel converter can generate a high voltage source by in series stacking a plurality of sub-modules 5 with a low voltage source when AC energy is converted into DC energy and vice versa.

The Modular Multilevel Converter (MMC) includes a total of three legs, one for each phase. Here, each leg includes an upper arm 6a and a lower arm 6b, and each arm includes sub-modules 5 that are connected in series.

FIG. 2 is a view illustrating types of sub-modules of a modular multilevel converter for HVDC. Examples of sub-modules include a Half Bridge (HB)-type sub-module, a Full Bridge (FB)-type sub-module, and a Camp Double (CD)-type sub-module. Most of the commercialized HDVC modular multilevel converters are using the HB-type.

The MMC has the following advantages. A sub-module unit is manufactured using an IGBT with a low voltage specification, and the MMC can have a withstand voltage ability with respect to a high voltage of hundreds of KV by stacking the sub-modules in series. Also, a waveform close to a basic wave (sine wave) can be formed using a plurality of sub-modules without a separate filter. Active power control and reactive power control that are known as a limitation of the current-type converter can be independently performed, and there is no need to together supply reactive power which corresponds to 50% of the transmission power for the active power control. Also, each of converters located at the both ends of a high DC voltage can be stably controlled without using the state or information of the counter converter.

However, the HVDC converter with the modular multi-level converter has limitations that are not present in the current-type converter.

In other words, the capacity voltage in the sub-modules is not uniform. Also, since a combined voltage of the upper arm and the lower arm is not the same as a DC_link voltage, a current corresponding to the half of a phase current and a circulating current including an AC component having a frequency two times larger than the system frequency flow in each arm of the multi-level converter. This circulating current flows only in the multilevel converter, and is known to be unnecessary for transmitting electrical energy.

As described above, if the circulating current increases in the HVDC multilevel converter, a current of a reactive component that does not act in the energy conversion additionally flows, and thus the current specifications of the components (IGBT, capacitor, SCR, and fast switch) used in the sub-modules become higher, resulting in an increase of the material cost. Also, since the fluctuation range of the sub-module voltage becomes larger, the sub-module cannot be stably controlled. Also, due to a signal type in which a lot of harmonic components are included in the arm current waveform, the loss of the converter increases, making it difficult to increase the efficiency of the converter.

Hereinafter, a representative method for inhibiting the circulating current component generated in the HVDC converter to which the modular multilevel converter is applied will be described below.

In the modular multilevel converter for the HVDC system, a method of separating and controlling an upper arm and a lower arm for each phase and a method of smoothing a sub module voltage was greatly developed by Antonios Antonopoulos (2009). Also, regarding the unbalanced system voltage condition as well, a current controlling method capable of effectively and quickly controlling the active power (or the DC_link constant voltage control) and the reactive power was developed by Maryam Saeedifard (2010), which is shown in FIG. 3.

On the basis of these technical foundations, various methods have been proposed on the method of suppressing a circulating current generated in the modular multilevel converter. Qingrui Tu (2012) has proposed a method of suppressing a circulating current in both balanced voltage condition and unbalanced system voltage.

FIG. 4 is a schematic view illustrating a method for suppressing a circulating current in a modular multilevel converter for an HVDC system, published by Qingrui Tu [IEEE Trans. on Power Delivery, vol. 27, 2012]. Qingrui Tu (2012) proposed a method for suppressing a circulating current by introducing a method of controlling a negative sequence component and a zero sequence component among the components of the circular current to zero in order to remove the circulating current.

In other words, Qingrui Tu proposed a method of suppressing a circular current by calculating a compensation value $v^*_{diffj}$ indicated by A of FIG. 3 in his thesis of 2012.

To see the method proposed by Qingrui Tu in more detail, as shown in FIG. 4, in case of the negative sequence component, the control objectives (command values) $i^{n*}_{ccd} = 0$ and $i^{n*}_{ccq} = 0$ are given in the d-q frame (d-q rotating coordinate system), and the output of the $v^n_{ccd}$ and $v^n_{ccq}$ is controlled through a PI controller 7 so that the component of d-axis ($i^n_{ccd}$) and the component of q-axis ($i^n_{ccq}$) are followed among the negative sequence components of the circulating current. Also, the 2-phase is inversely converted into the 3-phase through $T^{-1}(2\theta_s)$ to add to the calculation of the compensation value $V_{diff\_abc}$.

Also, in case of the zero sequence component, a method of giving a control objective in the abc frame (3-phase stationary reference frame), adding up all six voltage values $u_{pa}$, $u_{na}$, $u_{pb}$, $u_{nb}$, $u_{pc}$, $u_{nb}$ (here, the subscripts p, a, and n indicate upper arm, phase, and lower arm, respectively) of the upper arm and the lower arm in each phase (a, b, c phase), dividing the added value by three, and then outputting $V_{diff0\_abc}$ through a band pass filter 8 to calculate the compensation value ($V_{diff\_abc}$) was applied.

In other words, the method proposed by Qingrui Tu is a method of suppressing a circulating current in consideration of only the negative sequence component and zero sequence component among the components of the circulating current.

Accordingly, in the related-art method for suppressing the circulating current (Qingrui Tu, 2012), it is necessary to separate the component of the circulating current into the positive sequence component, the negative sequence component, and the zero sequence component, and all information on the upper arm voltage and the lower arm voltage need to be known. Also, the method does not include the concept of removing the positive sequence component of the circulating current. Furthermore, the stationary state characteristics are good, but the transient state characteristics are not good and a pulsating current occurs in the direct current line.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for suppressing a circulating current in a modular multi-level converter for high voltage direction-current transmission, which can save the manufacturing cost by completely removing an AC component of a circulating current shown in a modular multi-level converter and relatively reducing the current specification of an IGBT and a capacitor applied to the modular multi-level converter, stabilize a sub-module voltage of the converter for HVDC transmission having the modular multi-level converter, and contribute to the improvement of the efficiency of the multi-level converter.

In one aspect, the present invention provides a method for suppressing a circulating current in a modular multi-level converter for a high voltage direction-current (HVDC) transmission system converting an alternating current (AC) into a direct current (DC) and vice versa, transmitting energy using a DC cable, and having a modular multilevel converter generating a high voltage source by stacking a plurality of sub-modules in series, the method including: receiving a circulating current ($i_{diffj}$; j=a,b,c) of a,b,c phase in an abc 3-phase stationary reference frame, a DC current ($i_{dc}$) flowing in a DC cable, a current reference value ($i^*_{dc}$) of a DC component that needs to flow in the DC cable; controlling the circulating current ($i_{diffj}$) of the a,b,c phase to become zero; and outputting a compensation value ($V^*_{diffj}$) for suppressing a harmonic component of the circulating current.

In an exemplary embodiment, the controlling of the circulating current ($i_{diffj}$) of the a,b,c phase to become zero may include: dividing the circulating current ($i_{diffj}$) generated in the modular multilevel converter for HVDC into a DC component ($i_{dc}/3$) and an AC component ($i_{zj}$); calculating the AC component ($i_{zj}$) of the circulating current ($i_{diffj}$) by eliminating the DC component from the circulating current using Equation (55) below; modeling the AC component of the circulating current from which the DC is eliminated into a form in which all of a positive sequence component ($i^p_{zj}$), a negative sequence component ($i^n_{zj}$), and a zero sequence component ($i^0_{zj}$) exist; and simultaneously removing the positive sequence component ($i^p_{zj}$), the negative sequence component ($i^n_{zj}$), and the zero sequence component ($i^0_{zj}$) that are the AC component of the circulating current using Equation (54).

$$i_{zj} = i^p_{zj} + i^n_{zj} + i^0_{zj} = 0 \quad \text{(control objective function)} \tag{54}$$

$$i_{zj} = i_{diffj} - \frac{i_{dc}}{3} \tag{55}$$

In another exemplary embodiment, the removing of the AC component may be performed in the 3-phase stationary reference frame by Equations (56) and (57) below by applying a Proportional-Integral and Resonant (PIR) controller having an infinite gain at a frequency of $\pm 2\omega_0$ when an angular frequency ($\omega 0$) equals to $2\pi f_0$ at a power system frequency of $f_0$.

$$V_{j\_diffcrtripple\_rej\_ref} = PIR[i^*_{zj} - i_{zj}](\text{with } i^*_{zj} = 0, j = a, b, c) \tag{56}$$

$$PIR[\text{error}] = \left\{ K_p + \frac{K_i}{s} + \frac{2K_r s}{s^2 + (2\omega_0)^2} \right\} \times \text{error} \quad (57)$$

here, $i^*_{zj}$: AC component reference value among components of circulating current $V_{j\_diffcrtripple\_rej\_ref}$: output value after controller for suppressing AC component of circulating current $K_p$, $K_i$, $K_r$: proportional gain, integral gain, proportional gain of resonant controller error: signal input including error information a,b,c: division factors for dividing 3-phase system voltage into a-phase, b-phase, c-phase s: d( )/dt in Laplace transform In still another exemplary embodiment, the controlling of the circulating current ($i_{diffj}$) of the a,b,c phase includes: calculating the current reference value ($i^*_{dc}$) of the DC component that needs to flow in the DC cable using the energy conservation law that energy ($P_{acpower}$) measured in an AC system equals to energy ($P_{dcpower}$) measured in a DC system; extracting a current ($i^*_{dc}-i_{dc}$) of an AC harmonic component flowing in a DC link terminal by eliminating a current ($i_{dc}$) flowing in the DC link terminal from the calculated current reference value (GO of the DC component; allowing the extracted current ($i^*_{dc}-i_{dc}$) of the AC harmonic component to be an input value of a PIR controller and controlling the PIR controller having a resonant point at a frequency of $\pm 2\omega_0$ such that the current ($i^*_{dc}-i_{dc}$) of the AC harmonic component becomes zero by Equation (61) below, and the AC harmonic component included in a DC current flowing in the DC cable is removed.

$$P_{acpower} = P_{dcpower} \quad (58)$$

$$P_{dcpower} = V_{dc} i_{dc} \quad (59)$$

$$i^*_{dc} = P_{acpower}/V_{dc} (\text{with } P_{acpower}: \text{known}) \quad (60)$$

$$V_{dccrtripple\_rej\_ref} = PIR[i^*_{dc}-i_{dc}] \quad (61)$$

Here, $V_{dc}$: DC cable voltage (DC_link voltage) of HVDC $V_{dccrtripple\_rej\_ref}$: output value after controller for suppressing AC component of DC cable current of HVDC $$PIR[\text{error}] = \left\{ K_p + \frac{K_i}{s} + \frac{2K_r s}{s^2 + (2\omega_0)^2} \right\} \times \text{error}$$

here,

Kp, Ki, Kr: proportional gain, integral gain, proportional gain of resonant controller error: signal input including error information s: d( )/dt in Laplace transform In yet another exemplary embodiment, the outputting of the compensation value ($V^*_{diffj}$) for suppressing the harmonic component of the circulating current includes generating voltage reference values ($V^*_{diffa}$, $V^*_{diffb}$, $V^*_{diffc}$) of a circulating current suppression component by adding up an output value ($V_{j\_diffcrtripple\_rej\_ref}$) of the circulating current after an AC component suppression controller and an output value ($V_{dccrtripple\_rej\_ref}$) of the DC cable current after the AC component suppression controller by Equation (62) below.

$$V^*_{diffj} = V_{j\_diffcrtripple\_rej\_ref} + V_{dccrtripple\_rej\_ref} (\text{with } j=a,b,c) \quad (62)$$

In still yet another exemplary embodiment, the outputting of the compensation value ($V^*_{diffj}$) for suppressing the harmonic component of the circulating current may include calculating voltage reference values ($V_{pj}$, $V_{nj}$) of an upper arm and a lower arm of the modular multilevel converter by Equations (63) and (64) below so as to be linked with a control algorithm of the modular multilevel converter.

$$V_{pj} = \frac{V_{dc}}{2} - V_{j-ref} - V^*_{diffj} \text{ (with } j=a,b,c\text{)} \quad (63)$$

$$V_{nj} = \frac{V_{dc}}{2} + V_{j-ref} - V^*_{diffj} \text{ (with } j=a,b,c\text{)} \quad (64)$$

Here, $V_{j-ref}$: controller output for controlling reactive power and active power (or DC_link voltage control) of multilevel converter $V_{dc}$: DC cable voltage (DC_link voltage) of HVDC In a further exemplary embodiment, the calculating of the AC component ($i_{zj}$) of the circulating current ($i_{diffj}$) may include applying the current reference value ($i^*_{dc}$) of the DC component that needs to flow in the DC cable using the energy conservation law that energy measured in an AC system equals to energy measured in a DC system, and then calculating the AC component ($i_{zj}$) of the circulating current ($i_{diffj}$) by an equation, $i_{zj} = i_{diffj} - i^*_{dc}/3$.

In another further exemplary embodiment, when the circulating currents ($i_{diffa}$, $i_{diffb}$, $i_{diffc}$) at the 3-phase stationary reference frame are expressed in a 2-phase stationary reference frame ($\alpha$-$\beta$ frame), a compensation value (voltage reference value) for suppressing an $\alpha$-axis AC harmonic component of the circulating current may be calculated by an equation $V_{\alpha\_diffcrtripple\_rej\_ref} = PIR[i^*_{diffa} - i_{diffa}]$, and a compensation value (voltage reference value) for suppressing a $\beta$-axis AC harmonic component of the circulating current may be calculated by an equation $V_{\beta\_diffcrtripple\_rej\_ref} = PIR[i^*_{diff\beta} - i_{diff\beta}]$, Here, $i_{diff\,\alpha}$: $\alpha$-axis component $i_{diff\,\beta}$: $\beta$-axis component $i^*_{diff\,\alpha}$: reference value with respect to $\alpha$-axis circulating current $i^*_{diff\,\beta}$: reference value with respect to $\beta$-axis circulating current In still another further exemplary embodiment, when the circulating currents ($i_{diffa}$, $i_{diffb}$, $i_{diffc}$) at the 3-phase stationary reference frame are expressed in a d-q rotating coordinate system and the component of the circulating current is divided into positive sequence components ($i^p_{diffd}$, $i^p_{diffq}$), negative sequence components ($i^n_{diffd}$, $i^n_{diffq}$), and a zero sequence component ($i^0_{diff}$), five components ($i^p_{diffd}$, $i^p_{diffq}$, $i^n_{diffd}$, $i^n_{diffq}$, $i^0_{diff}$) of the circulating current are simultaneously removed.

In yet another further exemplary embodiment, a reference voltage ($V^p_{diffd}$) for suppressing a d-axis positive sequence component circulating current is calculated by an equation $V_{diffd}^p = PI[i_{diffd}^{p*} - i_{diffd}^p] = PI[-i_{diffd}^p]$; a reference voltage ($V^p_{diffq}$) for suppressing a q-axis positive sequence component circulating current is calculated by an equation $V_{diffq}^p = PI[i_{diffq}^{p*} - i_{diffq}^p] = PI[-i_{diffq}^p]$; a reference voltage ($V^n_{diffd}$) for suppressing a d-axis negative sequence component circulating current is calculated by an equation $V_{diffd}^n = PI[i_{diffd}^{n*} - i_{diffd}^n] = PI[-i_{diffd}^n]$; a reference voltage ($V^n_{diffq}$) for suppressing a q-axis negative sequence component circulating current is calculated by an equation $V_{diffq}{}^n = PI[i_{diffq}{}^{n*} - i_{diffq}{}^n] = PI[-i_{diffq}{}^n]$; and a reference voltage ($V^0_{diff}$) for suppressing a zero sequence component circulating current is calculated by an equation $V_{diff}{}^0 = PI[i_{diff}{}^{0*} - i_{diff}{}^0] = PI[-i_{diff}{}^0]$.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
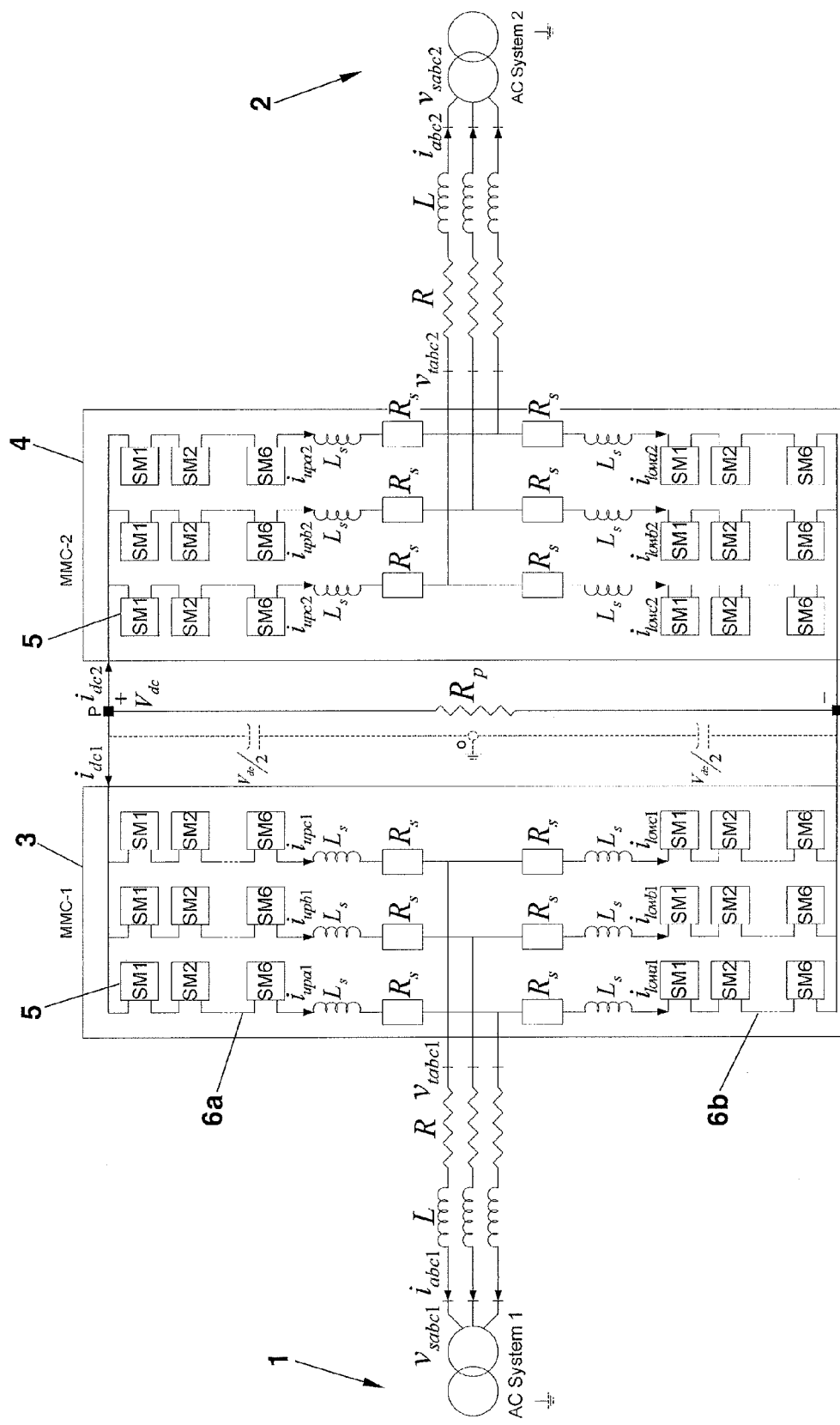
FIG. 1 is a diagram illustrating an overall configuration of a High Voltage Direct-Current (HVDC) system with a modular multilevel converter.
Figure 2:
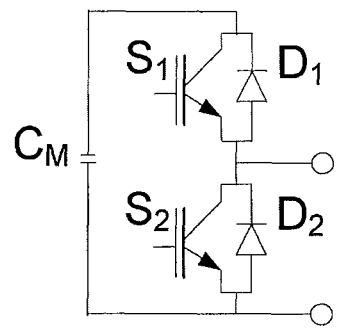
FIG. 2 is a circuit diagram illustrating types of sub-modules of an HVDC modular multilevel converter.
Figure 2:
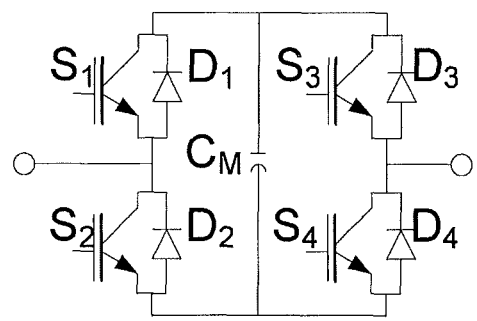
Figure 2:
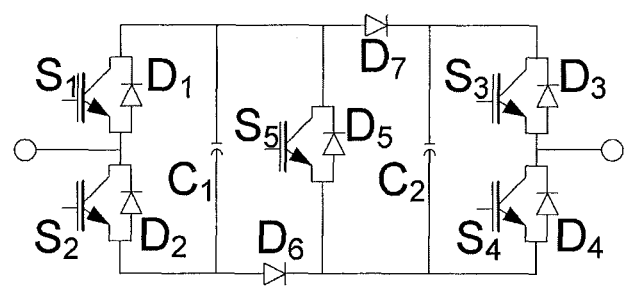
Figure 3:
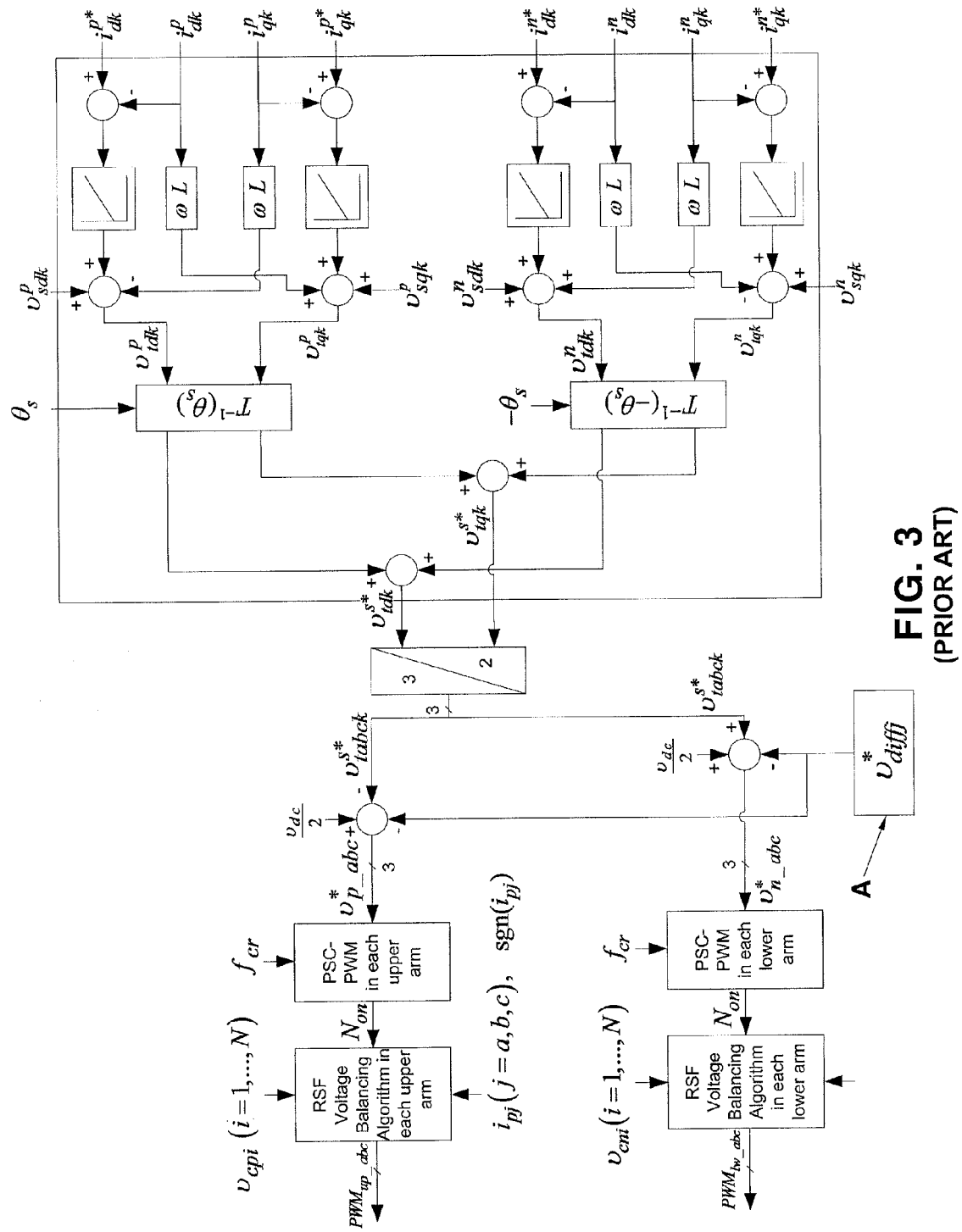
FIG. 3 is a block diagram illustrating a control of a modular multilevel converter for an HVDC system
Figure 4:
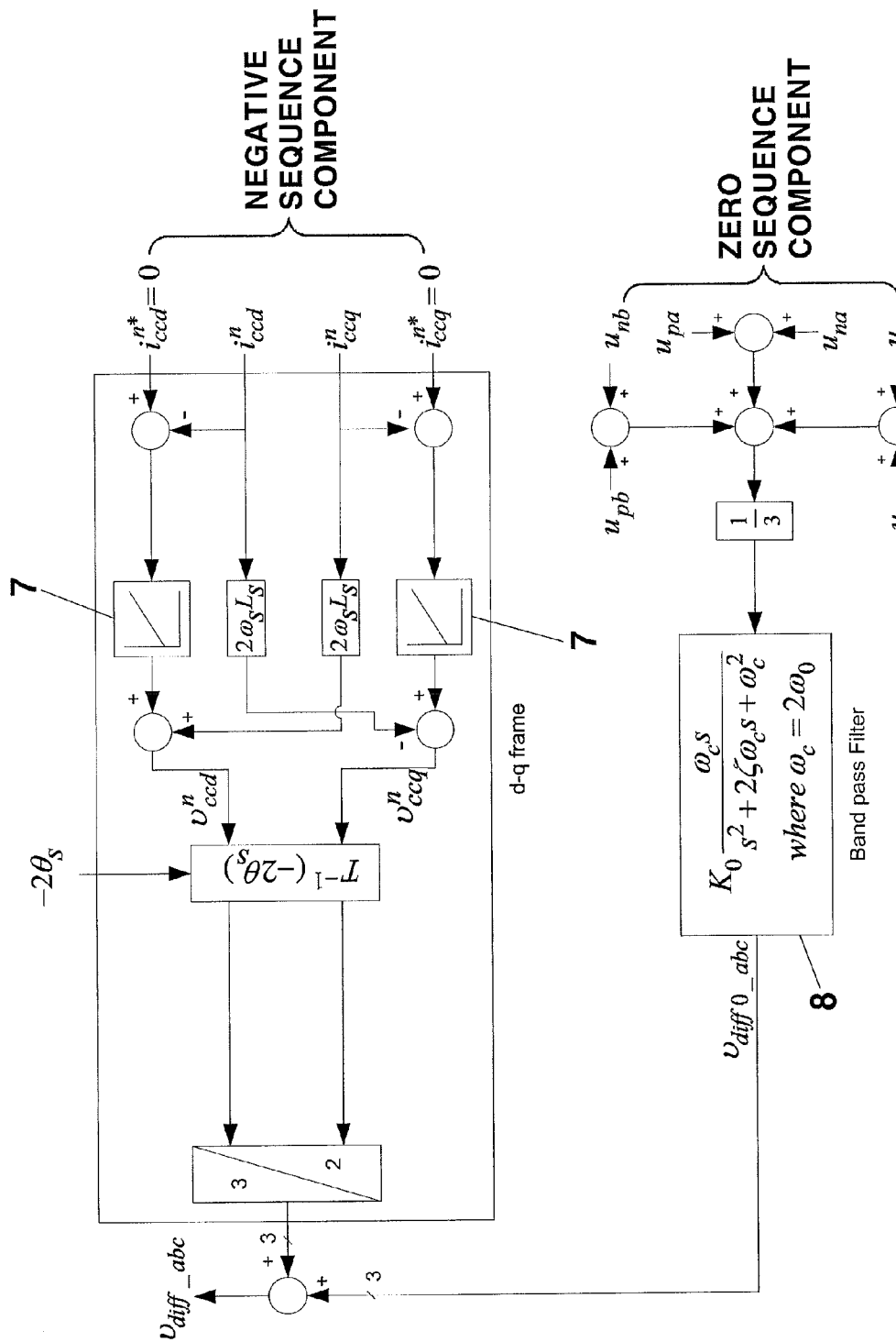
FIG. 4 is a block diagram illustrating a typical method of suppressing a circulating current of a modular multilevel converter for an HVDC system.
Figure 5:
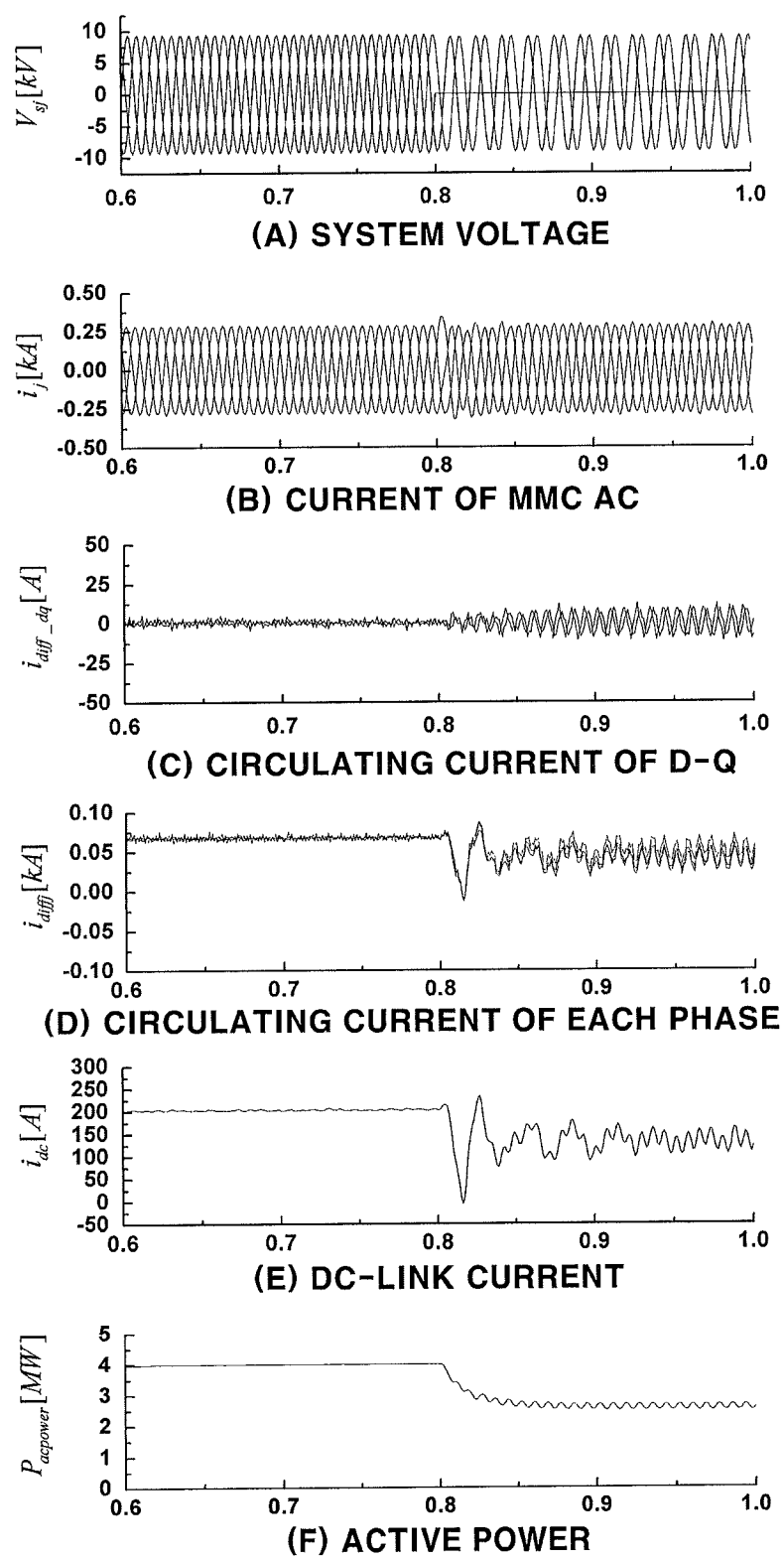
FIG. 5 is a graph illustrating control characteristics of an HDVC multilevel converter when suppression control is not performed on a circulating current.

Reference numerals set forth in the Drawings includes reference to the following elements as further discussed below:

1,2: AC system
3,4: modular multilevel converter
5: sub-module
6a: upper arm
6b: lower arm
10: PIR controller
11: PI controller
12: resonant controller It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above and other features of the invention are discussed infra.

Hereinafter, exemplary embodiments of the present invention will be described in detail with reference to the accompanying drawings so that those skilled in the art can easily carry out the present invention.

The present invention relates to a method of suppressing a circulating current of a modular multilevel converter for high voltage direct-current transmission, which can completely remove a circulating current generated in the modular multilevel converter in both 3-phase balanced voltage condition and 3-phase balanced voltage condition, in consideration of all of a positive sequence component, a negative sequence component, and a zero sequence component among the components of the circulating current for High Voltage Direction Current (HVDC).

Also, the method of suppressing the circulating current proposed in the present disclosure can completely remove all of the positive sequence component, the negative sequence component, and the zero sequence component in consideration of all of them, by performing generalization in an abc frame without dividing the components of the circulating current into the positive sequence component, the negative sequence component, and the zero sequence component through a PIR controller (including both PI controller and resonance controller).

Differences between a related art (Qingrui Tu, 2012) and the present invention are as follows.

First, the negative sequence component and the zero sequence component are considered regardless of the positive sequence component (not a target to be controlled) among the components of the circulating current in the related art, whereas the present invention considers all of the positive sequence component, the negative sequence component, and the zero sequence component.

Second, the negative sequence component is controlled in a d-q frame, and the control objective is achieved through a PI controller, that is, the negative sequence component is divided into a d-axis component and a q-axis component to make each of them zero in the related art, whereas the present invention shows the same effect as considering all of the positive sequence component, the negative sequence component, and the zero sequence component that are not considered in the related art by a generalized control method, by controlling the circulating current of a, b, c phase in the abc frame (3-phase stationary reference frame) using PIR.

Also, in the implementation method using a typical PI controller, since the components of the circulating current are divided into the positive sequence component and the negative sequence component and then the positive sequence component and the negative sequence component are again divided into the d-axis component and the q-axis component to be controlled, the control method is very completed in the related art. However, in the present invention, the components of the circulating current need not to be divided into the positive sequence component and the negative sequence component using the PIR controller, but only need to be divided into a,b,c phases, thereby simplifying the implementation method.

Third, in case of the zero sequence component, the relate art and the present invention have a similar aspect in that both are implemented in the abc 3-phase stationary reference frame. However, there is a difference in that the related art adopts a method of adding up all voltage values applied to each sub-module 5 of the upper arm and the lower arm but the present invention adopts a method of subtracting a DC current $i_{dc}$ from the circulating current $i_{diffj}$ by each a,b,c phase.

Hereinafter, a method of suppressing a circulating current of a modular multilevel converter for HVDC according to an embodiment of the present invention will be described in detail.

An HVDC system according to an embodiment of the present invention may be applied between two high voltage AC transmission system 2 1 and 2 with different frequencies and voltages, between two high voltage AC transmission systems 1 and 2 with the same frequency and voltage, or between two high voltage AC transmission systems 1 and 2 with different frequencies or voltages.

The HVDC system may include one energy conversion device (converter) that converts AC energy into DC energy and the other conversion device (converter) that converts DC energy into AC energy, and may transport energy to a long distance using a DC cable between the converters.

The energy conversion device may be a modular multilevel converter that can generate a high voltage source by in series stacking a plurality of sub-modules 5 with a low voltage source when AC energy is converted into DC energy and vice versa.

Here, a method for suppressing a circulating current according to an embodiment of the present invention can suppress a circulating current generated in a modular multilevel converter under both 3-phase balanced voltage condition and 3-phase unbalanced voltage condition, without decomposing the components of the circulating current into the positive sequence component, the negative sequence component, and the zero sequence component and using a zero sequence component estimator.

The circulating current generated in the modular multilevel converter for HVDC may be a DC component and an AC component. The AC component $i_{zj}$ of the circulating current may be modeled into a form in which all of the positive sequence component $i^p_{zj}$, the negative sequence component $i_{nzj}$, and the zero sequence component i0zj exist. All of the positive sequence component $i_{pzj}$, the negative sequence component $i_{nzj}$, and the zero sequence component i0zj are to be removed.

Here, the DC component is not a target to be removed because the DC component is an essential component for carrying an energy transmission ability on a DC line.

In order to derive a control equation of the modular multilevel converter, a modeling equation regarding the modular multilevel converter will be first referred to.

Figure 7:
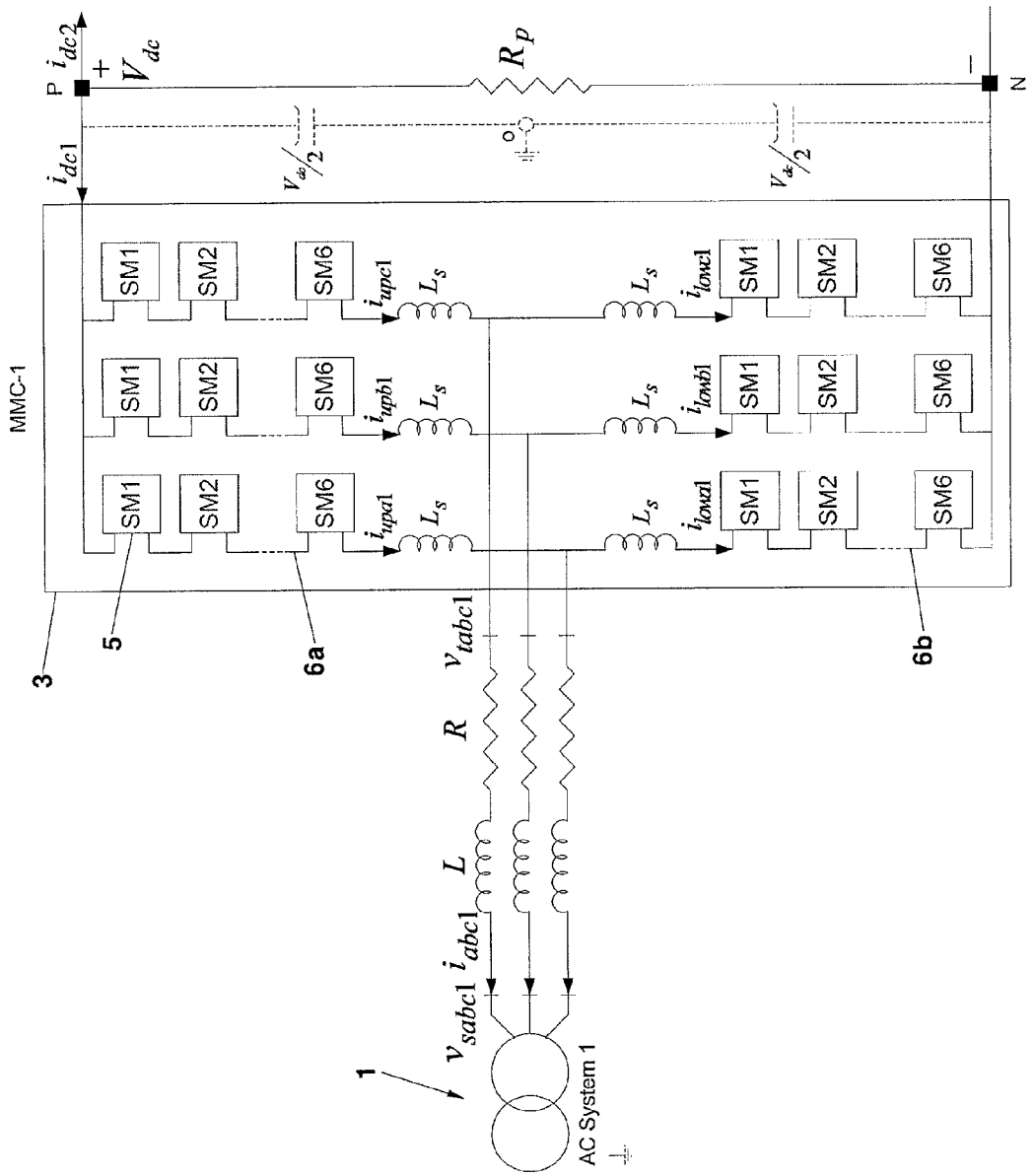
FIG. 7 is a diagram illustrating a modular multilevel converter, showing only a station 1 of the HVDC system of FIG. 1

Assuming that a capacitor voltage on an upper arm 6a of the multilevel converter is $v_{cpj}$ (j=a,b,c), a capacitor voltage on a lower arm 6b is $v_{cnj}$ (j=a,b,c), an inductor for circulating current suppression is Ls, a cable resistance of the upper and lower arms is Rs, and an upper arm current $i_{pj}$ and a lower arm current $i_{nj}$ flow as shown in FIG. 7, the voltage equation ($v_{pj}$) of the upper arm 6a can be expressed as Equation (1), and the voltage equation ($v_{nj}$) of the lower arm 6b can be expressed as Equation (2).

$$v_{pj} = \sum_{i=1}^{N_{pj}} (v_{Cpji}) + L_s \frac{di_{pj}}{dt} + R_s i_{pj}; \quad (1)$$
$$j = a, b, c$$

$$v_{nj} = \sum_{i=1}^{N_{nj}} (v_{Cnji}) + L_s \frac{di_{nj}}{dt} + R_s i_{nj}; \quad (2)$$
$$j = a, b, c$$

$v_{pj}$: upper arm voltage
$v_{cpj}$: upper arm capacitor voltage (j=a,b,c)
$i_{pj}$: upper arm current
$v_{nj}$: lower arm voltage
$v_{cnj}$: lower arm capacitor voltage (j=a,b,c)
$i_{nj}$: lower arm current
Ls: circulating current suppressing inductor
Rs: cable resistance of upper and lower arms
$N_{pj}$, $N_{nj}$: number of sub-modules in upper arm (lower arm) at phase j.

The first term of Equation (1) denotes the sum of the capacitor voltages that the upper arm 6a has, and the first term of Equation (2) denotes the sum of the capacitor voltages that the lower arm 6b has. These can be defined as Equations (3) and (4) to obtain Equations (5) and (6).

$$u_{pj} = \sum_{i=1}^{N_{pj}} (v_{Cpji}) \quad (3)$$

$$u_{nj} = \sum_{i=1}^{N_{nj}} (v_{Cnji}) \quad (4)$$

$u_{pj}$: sum of capacitor voltages of upper arm
$u_{nj}$: sum of capacitor voltages of lower arm $$v_{pj} = \mu_{pj} + L_s \frac{di_{pj}}{dt} + R_s i_{pj}; \quad (5)$$
$$j = a, b, c$$

$$v_{nj} = \mu_{nj} + L_s \frac{di_{nj}}{dt} + R_s i_{nj}; \quad (6)$$
$$j = a, b, c$$

Hereinafter, a relationship between a current $i_{pj}$ flowing in the upper arm 6a and a current $i_{nj}$ flowing in the lower arm 6b in the modular multilevel converter will be summarized.

When a phase current flowing in 3-phase AC system connected to the multilevel converter is defined as $i_j$ (j=a,b, c), a DC component of the circulating current is defined as $i_{dc}/3$, and an AC component of the circulating current is defined as $i_{zj}$, a current $i_{pj}$ flowing in the upper arm 6a and a current $i_{nj}$ flowing in the lower arm 6b can be expressed as Equations (7) and (8), respectively.

$$i_{pj} = \frac{i_j}{2} + \frac{i_{dc}}{3} + i_{zj}; \quad (7)$$
$$j = a, b, c$$

$$i_{nj} = -\frac{i_j}{2} + \frac{i_{dc}}{2} + i_{zj}; \quad (8)$$
$$j = a, b, c$$

$$i_{za} + i_{zb} + i_{zc} = 0 \quad (9)$$

$i_{zj}$: AC component of circulating current

In Equations (7) and (8), since the second and third terms at the right denote the circulating current, this can be expressed as Equations (10) and (11) which are expressed with one circulating current parameter, respectively.

$$i_{pj} = \frac{i_j}{2} + i_{diffj}; \quad (10)$$
$$j = a, b, c$$

$$i_{nj} = -\frac{i_j}{2} + i_{diffj}; \quad (11)$$
$$j = a, b, c$$

$$i_{diffj} = \frac{i_{dc}}{3} + i_{zj} \quad (12)$$

$i_{diffj}$ circulating current

Equation (10) and Equation (11) are added up to obtain Equation (13). If the current $i_{pj}$ flowing in the upper arm 6a and the current $i_{nj}$ flowing in the lower arm 6b can be measured, the circulating current can be estimated by averaging two signals.

$$i_{diffj} = \frac{i_{pj} + i_{nj}}{2}; \quad (13)$$
$$j = a, b, c$$

A resistor is not connected both ends of a DC line of the modular multilevel converter, but a virtual neutral point "0" exists. Assuming that the virtual neutral point "o" has the same potential as the neutral point "o" of the AC system voltage $v_{tj}$ (j=a,b,c), it is possible to form a closed loop including an upper arm voltage $v_{pj}$, a phase voltage $v_{tj}o$, and a voltage $V_{dc}/2$ corresponding to the half of the DC line voltage via the virtual neutral point. Accordingly, a closed loop voltage equation regarding to the upper arm 6a can be expressed as Equation (14) below.

Similarly regarding the lower arm 6b, it is possible to form a closed loop including a lower arm voltage $v_{pj}$, a voltage $V_{dc}/2$ corresponding to the half of the DC line voltage via the virtual neutral point, and a converter output terminal voltage $v_{tjo}$. Accordingly, a closed loop voltage equation regarding the lower arm 6b can be expressed as Equation (15).

$$v_{pj} + v_{tjo} - \frac{V_{dc}}{2} = 0 \quad (14)$$

$$v_{nj} - \frac{V_{dc}}{2} - v_{tjo} = 0 \quad (15)$$

$v_{tj}$: AC system voltage
$V_{dc}/2$: half of DC lien voltage
$v_{tj}$: converter output terminal voltage If Equations (14) and (15) are substituted with Equations (5) and (6), respectively, Equations (16) and (17) can be obtained.

$$L_s \frac{d(i_{diffj})}{dt} + R_s(i_{diffj}) = \frac{V_{dc}}{2} - \frac{(\mu_{pj} + \mu_{nj})}{2} \quad (16)$$

$$v_{tjo} = \frac{(u_{nj} - u_{pj})}{2} - \frac{R_s}{2}(i_j) - \frac{L_s}{2}\frac{d(i_j)}{dt} \quad (17)$$

In Equation (16), since the left term denote internal dynamics that indicates an internal voltage of the modular multilevel converter by the component of the circulating current, the internal dynamics can be defined as $u_{diffj}$ to be expressed as Equation (18).

$$u_{diffj} = \frac{V_{dc}}{2} - \frac{(u_{pj} + n_{nj})}{2}2 \quad (18)$$

$$u_{diffj} = L_s \frac{d(i_{diffj})}{dt} + R_s(i_{diffj}) \quad (19)$$

$u_{diffj}$: internal voltage of MMC by component of circulating current

In Equation (17), since the right first term corresponds to a pure output voltage of the converter which is determined by controlling the upper arm voltage and the lower arm voltage in the multilevel converter, this can be defined as a pure converter voltage ej of each phase to be expressed as Equation (20).

$$v_{tjo} = e_j - \frac{R_s}{2}(i_j) - \frac{L_s}{2}\frac{d(i_j)}{dt} \quad (20)$$

$$e_j = \frac{(u_{nj} - u_{pj})}{2} \quad (21)$$

$e_j$: pure converter voltage of each phase

When $u_{pj}$ is evaluated using Equations (18) and (21), the upper arm voltage can be expressed as Equation (22) in consideration of an additional voltage component applied to each phase by the circulating current.

$$u_{pj} = \frac{V_{dc}}{2} - e_j - u_{diffj} \quad (22)$$

When $u_{nj}$ is evaluated using Equations (18) and (21), the lower arm voltage can be expressed as Equation (23) in consideration of an additional voltage component applied to each phase by the circulating current.

$$u_{nj} = \frac{V_{dc}}{2} + e_j - u_{diffj} \quad (23)$$

Assuming that there is a generalized current controller that performs control of the positive sequence component and the negative sequence component such that a method of controlling the active power (or DC_link constant voltage control) and the reactive power of the multilevel converter for HVDC has control characteristics even with respect to an unbalanced voltage, the output component ej of the multi-level converter can be expressed as Equation 24.

$$e_j = e_j^p + e_j^n \tag{24}$$

The superscript p of $e^p_j$ denotes a positive sequence component, and the superscript n of $e^n_j$ denotes a negative sequence component.

When the entire power that the upper arm 6a and the lower arm 6b of the modular multilevel converter have is defined as instantaneous power $P_{PUj}$, it can be expressed as Equation (25).

$$P_{PUj} = u_{pj} i_{pj} + u_{nj} i_{nj} \text{(with } j=a,b,c\text{)} \tag{25}$$

Relational expressions Equation (7)-Equation (8), and Equation (22)-Equation (23) necessary to calculate the instantaneous power, and an expression at the stationary reference frame (a,b,c frame) for each parameter are expressed as Equations (26) to (41).

$$u_{pj} = \frac{V_{dc}}{2} - e_j - u_{diffj} \text{ (with } j=a,b,c\text{)} \tag{26}$$

$$u_{nj} = \frac{V_{dc}}{2} + e_j - u_{diffj} \text{ (with } j=a,b,c\text{)} \tag{27}$$

$$i_{pj} = \frac{i_j}{2} + \frac{i_{dc}}{3} + i_{zj} = \frac{i_j}{2} + i_{diffj} \text{ (with } j=a,b,c\text{)} \tag{28}$$

$$i_{nj} = -\frac{i_j}{2} + \frac{i_{dc}}{3} + i_{zj} = -\frac{i_j}{2} + i_{diffj} \text{ (with } j=a,b,c\text{)} \tag{29}$$

$$e_j = e_j^p + e_j^n \tag{30}$$

$$e_a^p + e_a^n = E_a^p \sin(\omega_0 t + \alpha_+) + E_a^n \sin(\omega_0 t + \alpha_-) \tag{31}$$

$$e_b^p + e_b^n = E_b^p \sin\left(\omega_0 t - \frac{2}{3}\pi + \alpha_+\right) + E_a^n \sin\left(\omega_0 t + \frac{2}{3}\pi + \alpha_-\right) \tag{32}$$

$$e_c^p + e_c^n = E_c^p \sin\left(\omega_0 t + \frac{2}{3}\pi + \alpha_+\right) + E_c^n \sin\left(\omega_0 t - \frac{2}{3}\pi + \alpha_-\right) \tag{33}$$

$$u_{diffj} = u_{diffj}^p + u_{diffj}^n \text{ (with } \mu_{diffj}^p = 0\text{)} \tag{34}$$

$$u_{diffa}^n = E_{diffa}^n \sin(\omega t + \beta_-) \tag{35}$$

$$u_{diffb}^n = E_{diffb}^n \sin\left(\omega t + \frac{2}{3}\pi + \beta_-\right) \tag{36}$$

$$u_{diffc}^n = E_{diffc}^n \sin\left(\omega t - \frac{2}{3}\pi + \beta_-\right) \tag{37}$$

$$i_j = i_j^p + i_j^n \tag{38}$$

$$i_a^p + i_a^n = I_a^p \sin(\omega_0 t + \gamma_+) + I_a^n \sin(\omega_0 t + \gamma_-) \tag{39}$$

$$i_b^p + i_b^n = I_b^p \sin\left(\omega_0 t - \frac{2}{3}\pi + \gamma_+\right) + I_b^n \sin\left(\omega_0 t + \frac{2}{3}\pi + \gamma_-\right) \tag{40}$$

$$i_c^p + i_c^n = I_c^p \sin\left(\omega_0 t + \frac{2}{3}\pi + \gamma_+\right) + I_c^n \sin\left(\omega_0 t - \frac{2}{3}\pi + \gamma_-\right) \tag{41}$$

When Equation (25) is substituted with Equations (26) to (41) to evaluate, the instantaneous power of the modular multilevel converter, which is calculated in the stationary reference frame, can be evaluated as Equations (42) to (44).

$$p_{PUa} = \frac{V_{dc} i_{diffa}}{2} \tag{42}$$

$$\begin{bmatrix} 2 - 2U_{diffa\_ref} - k_a^p m_a^p \cos(\alpha_+ - \gamma_+) - k_a^n m_a^n \cos(\alpha_- - \gamma_+) - \\ k_a^p m_a^n \cos(\alpha_+ - \gamma_-) - k_a^n m_a^p \cos(\alpha_- - \gamma_-) + \\ k_a^p m_a^p \cos(2\omega_0 t + \alpha_+ + \gamma_+) + \\ k_a^n m_a^n \cos(2\omega_0 t + \alpha_- + \gamma_-) + \\ k_a^n m_a^p \cos(2\omega_0 t + \alpha_- + \gamma_+) + k_a^p m_a^n \cos(2\omega_0 t + \alpha_+ + \gamma_-) \end{bmatrix}$$

$$p_{PUb} = \tag{43}$$

$$\frac{V_{dc} i_{diffb}}{2} \begin{bmatrix} 2 - 2U_{diffb\_ref} - k_b^p m_b^p \cos(\alpha_+ - \gamma_+) - \\ k_b^n m_b^p \cos\left(+\alpha_- - \gamma_+ - \frac{2}{3}\pi\right) - \\ k_b^p m_b^n \cos\left(\alpha_+ - \gamma_- + \frac{2}{3}\pi\right) - k_b^n m_b^n \cos(\alpha_- - \gamma_-) + \\ k_b^p m_b^p \cos\left(2\omega_0 t + \frac{2}{3}\pi + \alpha_+ + \gamma_+\right) + \\ k_b^n m_b^n \cos\left(2\omega_0 t - \frac{2}{3}\pi + \alpha_- + \gamma_-\right) + \\ k_b^n m_b^p \cos(2\omega_0 t + \alpha_- + \gamma_+) + k_b^p m_b^n \cos(2\omega_0 t + \alpha_+ + \gamma_-) \end{bmatrix}$$

$$p_{PUc} = \tag{44}$$

$$\frac{V_{dc} i_{diffc}}{2} \begin{bmatrix} 2 - 2U_{diffc\_ref} - k_c^p m_c^p \cos(\alpha_+ - \gamma_+) - \\ k_c^n m_c^p \cos\left(\alpha_- - \gamma_+ + \frac{2}{3}\pi\right) - \\ k_c^p m_c^n \cos\left(\alpha_+ - \gamma_- - \frac{2}{3}\pi\right) - k_c^n m_c^n \cos(\alpha_- - \gamma_-) + \\ k_c^p m_c^p \cos\left(2\omega_0 t - \frac{2}{3}\pi + \alpha_+ + \gamma_+\right) + \\ k_c^n m_c^n \cos\left(2\omega_0 t + \frac{2}{3}\pi + \alpha_- + \gamma_-\right) + \\ k_c^n m_c^p \cos(2\omega_0 t + \alpha_- + \gamma_+) + k_c^p m_c^n \cos(2\omega_0 t + \alpha_+ + \gamma_-) \end{bmatrix}$$

In Equations (42) to (44), the first term indicates that there is a negative sequence component that backwardly rotates while having a frequency two times larger than the system frequency, and the second term indicates that there is a positive sequence component that forwardly rotates while having a frequency two times larger than the system frequency. Also, the third term indicates that there is a zero sequence component fluctuates into the same phase at 3-phase while rotating with a frequency two times larger than the system frequency, and the fourth term indicates that there is a DC component that is uniformly distributed while not fluctuating according to time and having different sizes at 3-phase.

Accordingly, since all except the DC power component are harmonic power, a controller may be designed such that all of the positive sequence component power, the negative sequence component power, and the zero sequence component power having a twice frequency become "0"

From this, Equations (45) to (47) can be obtained as a relational expression regarding the positive sequence component of the circulating current, and Equations (48) to (50) can be obtained as a relational expression regarding the negative sequence component of the circulating current. Also, Equations (51) to (53) can be obtained as a relational expression regarding the zero sequence component of the circulating current.

$$i_{diffa}k_a^n m_a^n \cos(2\omega_0 t + \alpha_- + \gamma_-) = 0 \quad (45)$$

$$i_{diffb}k_b^n m_b^n \cos\left(2\omega_0 t - \frac{2}{3}\pi + \alpha_- + \gamma_-\right) = 0 \quad (46)$$

$$i_{diffc}k_c^n m_c^n \cos\left(2\omega_0 t + \frac{2}{3}\pi + \alpha_- + \gamma_-\right) = 0 \quad (47)$$

$$i_{diffa}k_a^p m_a^p \cos(2\omega_0 t + \alpha_+ + \gamma_+) = 0 \quad (48)$$

$$i_{diffb}k_b^p m_b^p \cos\left(2\omega_0 t + \frac{2}{3}\pi + \alpha_+ + \gamma_+\right) = 0 \quad (49)$$

$$i_{diffc}k_c^p m_c^p \cos\left(2\omega_0 t - \frac{2}{3}\pi + \alpha_+ + \gamma_+\right) = 0 \quad (50)$$

$$i_{diffa}[k_a^n m_a^p \cos(2\omega_0 t + \alpha_- + \gamma_+) + k_a^p m_a^n \cos(2\omega_0 t + \alpha_+ + \gamma_-)] = 0 \quad (51)$$

$$i_{diffb}[k_b^n m_b^p \cos(2\omega_0 t + \alpha_- + \gamma_+) + k_b^p m_b^n \cos(2\omega_0 t + \alpha_+ + \gamma_-)] = 0 \quad (52)$$

$$i_{diffc}[k_c^n m_c^p \cos(2\omega_0 t + \alpha_- + \gamma_+) + k_c^p m_c^n \cos(2\omega_0 t + \alpha_+ + \gamma_-)] = 0 \quad (53)$$

Equations (45) to (53) indicates the AC component $i_{zj}$ of the circulating current $i_{diffj}$, and the positive sequence component $i_{pzj}$, the negative sequence component $i_{nzj}$, and the zero sequence component $i^0_{zj}$ need to be all removed. Accordingly, Equation (54) can be obtained from these, and the circulating current of such AC component can be obtained from the relational expressions like Equations (12) to (55).

As shown in Equation (56), harmonic components of the circulating current can be simultaneously removed by applying a resonant controller (R-controller) and a proportional-integral controller (PI-controller) having an infinite gain at $\pm 2\omega_0$ frequency to the circulating current of the positive sequence component, the negative sequence component, and the zero sequence component, which have $2\omega_0$ component in common.

In Equation (56) below, a PIR[ ] controller, which is a controller in which the PI-controller and the R-controller are combined, can be expressed as Equation (56).

$$i_{zj} = i_{zj}^p + i_{zj}^n + i_{zj}^0 = 0 \text{ (control objective function)} \quad (54)$$

$$i_{zj} = i_{diffj} - \frac{i_{dc}}{3} \quad (55)$$

$$V_{j\_differtripple\_rej\_ref} = PIR[i_{zj}^* - i_{zj}] \text{ (with } i_{zj}^* = 0, j = a, b, c) \quad (56)$$

$$PIR[\text{error}] = \left\{ K_p + \frac{K_i}{s} + \frac{2K_r s}{s^2 + (2\omega_0)^2} \right\} \times \text{error} \quad (57)$$

$i^*_{zj}$: AC component reference value among components of circulating current $V_{j\_differtripple\_rej\_ref}$ output value after controller for suppressing AC component of circulating current $K_p$, $K_i$, $K_r$: proportional gain, integral gain, proportional gain of resonant controller error: signal input including error information a,b,c: division factors for dividing 3-phase system voltage into a-phase, b-phase, c-phase s: d( )/dt in Laplace transform Also, in a related art, when a circulating current suppression method is applied, the harmonic component of the circulating current is suppressed, but harmonics increase in the current waveform $i_{ds}$ flowing in a DC cable between multilevel converters In order to solve this limitation, a current reference value $i^*_{dc}$ of the DC component that has to flow in a DC cable from the energy conservation law that energy measured at the AC system is identical to energy measured at the DC system, which can be expressed as Equations (58) to (60), may be calculated, and a DC current of the AC component may be obtained by eliminating the current $i_{dc}$ flowing in the DC_link terminal from the current reference value of the DC component.

Since the extracted AC component current has $2\omega_0$ frequency component, as shown in Equation (61), the AC harmonic component included in the DC current can be removed by applying the R-controller and the PI-controller having a resonant point at $2\omega_0$ frequency.

$$P_{acpower} = P_{dcpower} \quad (58)$$

$$P_{acpower} = V_{dc} i_{dc} \quad (59)$$

$$i^*_{dc} = P_{acpower}/V_{dc} \text{(with } P_{acpower}\text{:known)} \quad (60)$$

$$V_{dccrtripple\_rej\_ref} = PIR[i^*_{dc} - i_{dc}] \quad (61)$$

$V_{dc}$: DC cable voltage (DC_link voltage) of HVDC $V_{dccrtripple\_rej\_ref}$: output value after controller for suppressing AC component of DC cable current of HVDC $$PIR[\text{error}] = \left\{ K_p + \frac{K_i}{s} + \frac{2K_r s}{s^2 + (2\omega_0)^2} \right\} \times \text{error}$$

Figure 8A:
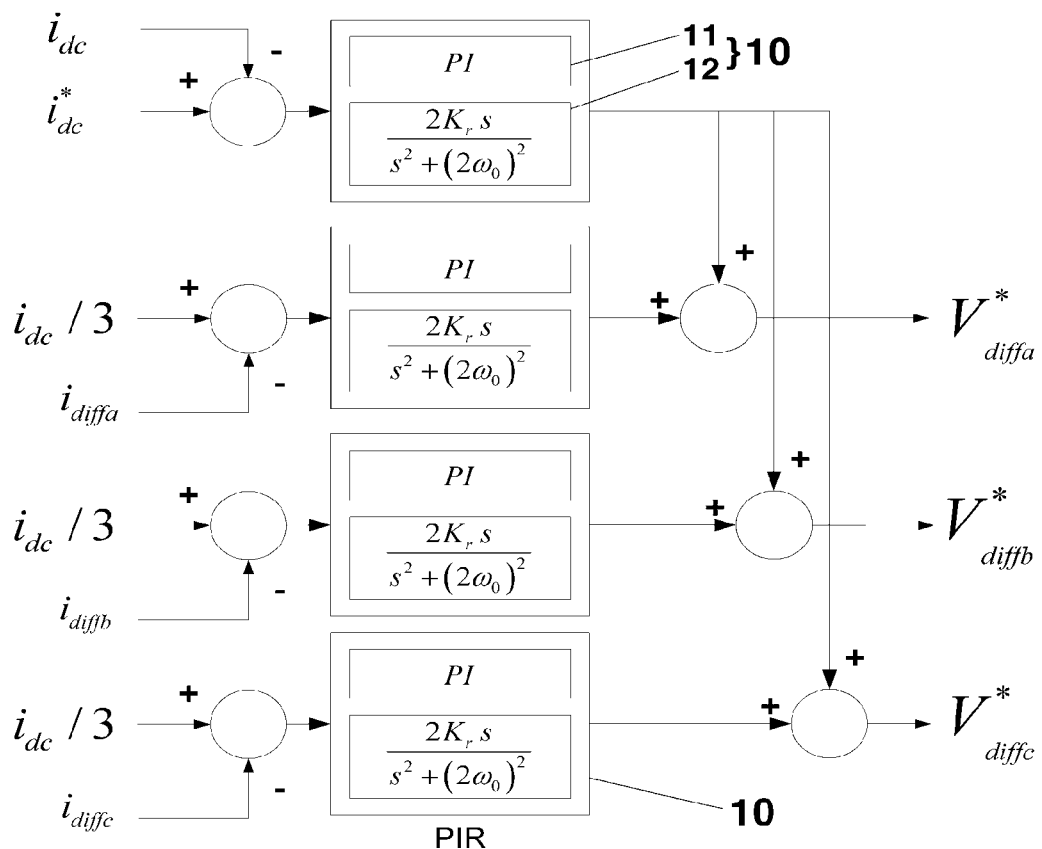
FIG. 8A is a block diagram illustrating a method of suppressing harmonic components of a circulating current according to an embodiment of the present invention.

$K_p$, $K_i$, $K_r$: proportional gain, integral gain, proportional gain of resonant controller error: signal input including error information S: d( )/dt in Laplace transform Using Equations (57) and (61), a compensation value $V^*_{diffj}$ for suppressing the circulating current harmonic component of the multilevel converter for HVDC can be calculated as shown in Equation (62), which can be represented as shown in FIG. 8A.

$$V^*_{diffj} = V_{j\_differtripple\_rej\_ref} + V_{dccrtripple\_rej\_ref} \text{(with } j=a, b, c) \quad (62)$$

Figure 8B:
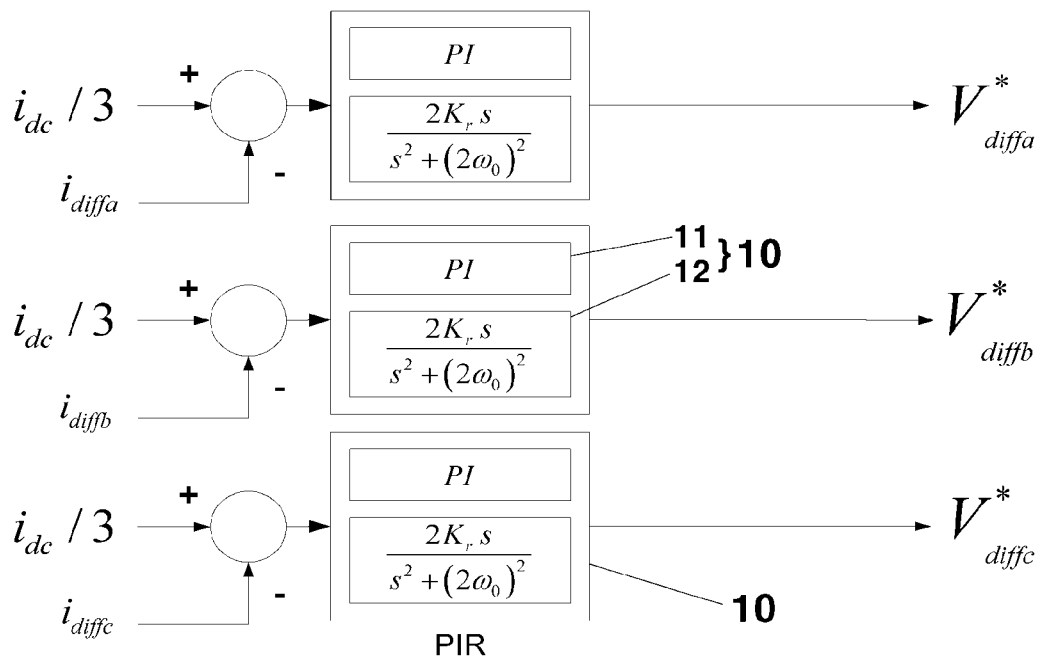
FIG. 8B is a block diagram illustrating a method of suppressing harmonic components of a circulating current according to another embodiment of the present invention.

FIG. 8B is a block diagram illustrating a method of suppressing harmonic components of a circulating current according to another embodiment of the present invention. The AC component $i_{zj}$ of the circulating current $i_{diffj}$ generated in the modular multilevel converters 3 and 4 for HVDC is not calculated by Equation (55), i.e., $i_{zj} = I_{diffj} - i_{dc}/3$. Instead of $i_{dc}/3$, the current reference value $i^*_{dc}$ of the DC component that has to flow in the DC cable based on the energy conservation law expressed by Equations (58) to (60) is applied, that is, the AC component $i_{zj}$ of the circulating current $i_{diffj}$ is calculated by the equation $i_{zj} = i_{diffj} - i^*_{dc}/3$ and applied to simply implement the control method for suppressing the harmonic component of the circulating current.

Figure 9:
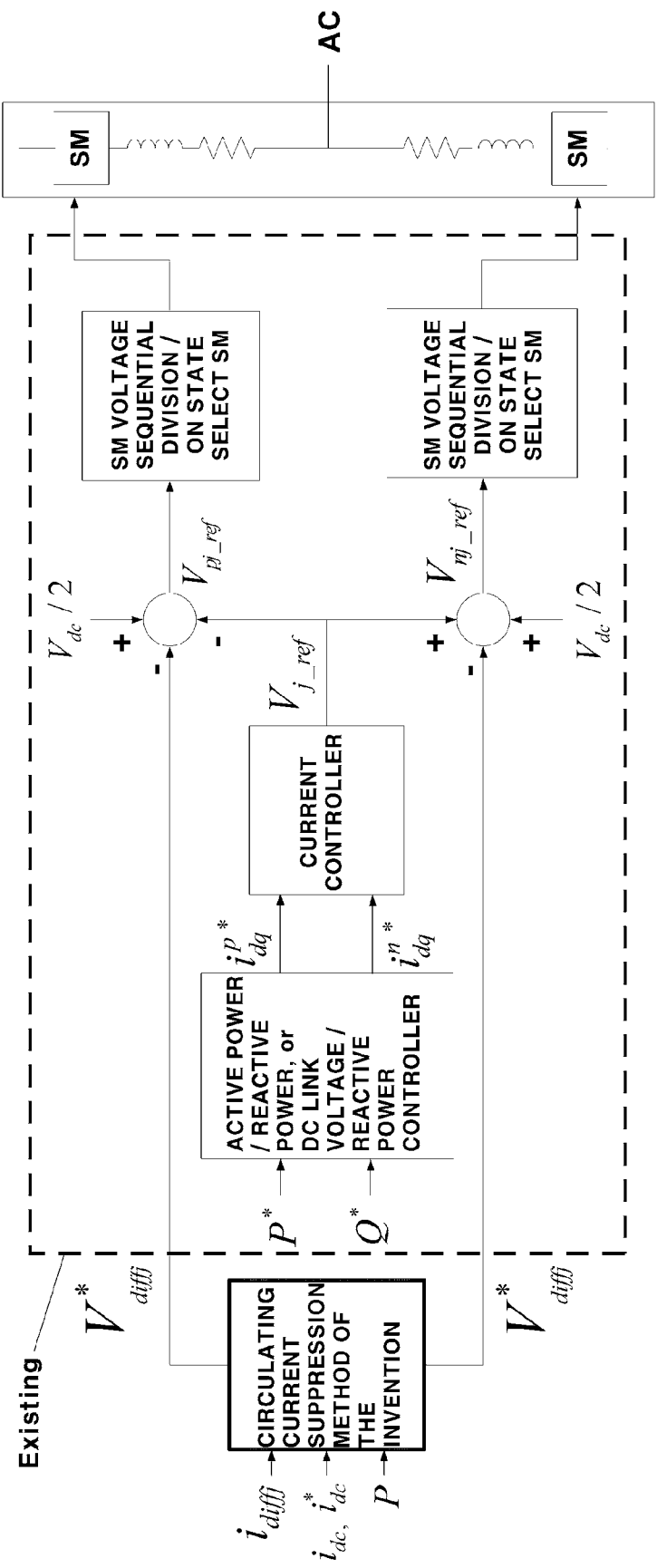
FIG. 9 is a block diagram illustrating a method of controlling a modular multilevel converter, including a method of suppressing harmonic components of a circulating current according to an embodiment of the present invention.

A linkage method between an HVDC multilevel converter control algorithm and the method for suppressing the harmonic component of the circulating current proposed in the present disclosure can be expressed as Equation (63). FIG. 9 is a block diagram illustrating a method of controlling a modular multilevel converter including the method for suppressing the harmonic component of the circulating current.

$$V_{pj} = \frac{V_{dc}}{2} - V_{j-ref} - V^*_{diffj} \text{ (with } j = a, b, c) \quad (63)$$

-continued $$V_{nj} = \frac{V_{dc}}{2} - V_{j-ref} - V_{diffj}^* \text{ (with } j = a, b, c) \quad (64)$$

In other words, FIGS. 8A and 8B are control block diagrams illustrating suppression of a circulating current of an HVDC multilevel converter proposed in the present disclosure, and FIG. 9 illustrates a linkage method between a typical HVDC multilevel converter control algorithm and the present invention.

As shown in FIG. 9, in the circulating current method (circulating current suppression controller using PIR) proposed in the present disclosure, $i_{diffj}$, $i_{dc}$, $i^*_{dc}$, and P are input values, and a compensation value $V^*_{diffj}$ for suppressing the harmonic component of the circulating current is an output value. Also, $V^*_{diffj}$ is a value obtained by eliminating the AC component of the circulating current from an output voltage value of the HDVC multilevel converter in consideration of all of the positive, negative, and zero sequence components.

Since the present invention can achieve the same purpose with different expressions according to the coordinate system, an implementation method in the stationary reference frame and an implementation method in the d-q rotating coordinate system will be together proposed.

When circulating currents $i_{diffa}$, $i_{diffb}$, and $i_{diffc}$ at a 3-phase stationary reference frame are expressed in a 2-phase stationary reference frame (α-β frame), an α-axis component and a β-axis component are expressed as $i_{diff\alpha}$ and $i_{diff\beta}$, and a circulating current reference value with respect to the α-axis component and a circulating current reference value with respect to the β-axis component is expressed as $i^*_{diff\alpha}$ and $i^*_{diff\beta}$, respectively, Equations (56) and (57) can be implemented in the 2-phase stationary reference frame as shown in Equations (66) and (67).

$V_{\alpha\_diffcrtripple\_rej\_ref}$ and $V_{\beta\_diffcrtripple\_rej\_ref}$ calculated in the 2-phase stationary reference frame may be again expressed as $V_{j\_diffcrtripple\_rej\_ref}$ in the 3-phase stationary reference frame. The same purpose can be achieved when Equation (62) is implemented by adding Equation (61) so as to remove the AC harmonic component.

$$V_{\alpha\_dccrtripple\_rej\_ref} = PIR[i^*_{diff\alpha} - i_{diff\alpha}] \quad (66)$$

$$V_{\beta\_dccrtripple\_rej\_ref} = PIR[i^*_{diff\beta} - i_{diff\beta}] \quad (67)$$

Also, when the circulating currents $i_{diffa}$, $i_{diffb}$, and $i_{diffc}$ at the 3-phase stationary reference frame are expressed in the d-q rotating coordinate system, the circulation currents can be decomposed into positive sequence components $i^p_{diffd}$ and $i^p_{diffq}$, negative sequence components $i^n_{diffd}$ and $i^n_{diffq}$, and a zero sequence component i0diff. Accordingly, controllers for removing all components can be expressed as Equations (68) to (72) in the d-q rotating coordinate system, respectively.

Although different in coordinate system, these Equations correspond to different expressions having the same meanings as Equations (56) and (57).

$$V^p_{diffd} = PI[i^{p*}_{diffd} - i^p_{diffd}] = PI[-i^p_{diffd}] \quad (68)$$

$$V^p_{diffq} = PI[i^{p*}_{diffq} - i^p_{diffq}] = PI[-i^p_{diffq}] \quad (69)$$

$$V^n_{diffd} = PI[i^{n*}_{diffd} - i^n_{diffd}] = PI[-i^n_{diffd}] \quad (70)$$

$$V^n_{diffq} = PI[i^{n*}_{diffq} - i^n_{diffq}] = PI[-i^n_{diffq}] \quad (71)$$

$$V^0_{diff} = PI[i^{0*}_{diff} - i^0_{diff}] = PI[-i^0_{diff}] \quad (72)$$

$$PI[\text{error}] = \left\{K_P + \frac{K_i}{s}\right\} \times \text{error} \quad (73)$$

Hereinafter, test results to verify the effects of applying a method for suppressing a harmonic component of a circulating current according to an embodiment of the present invention will be described as follows.

Figure 10:
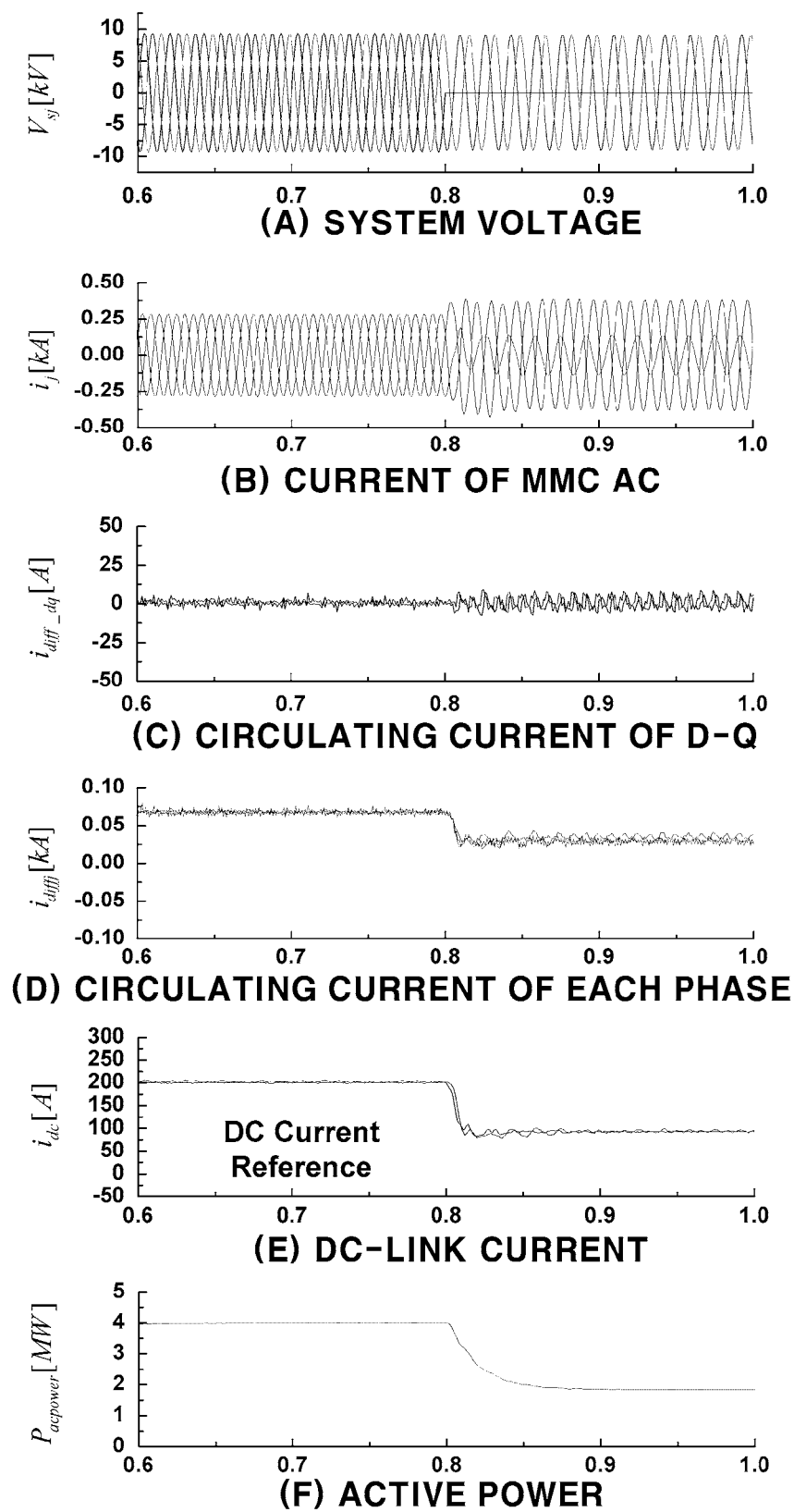
FIG. 10 is a graph illustrating control characteristics of a modular multilevel converter, including a method of suppression harmonic components of a circulating current according to an embodiment of the present invention.

The control characteristics regarding a modular multilevel converter for HVDC as described Table 1 below, which adopts a method for suppressing a harmonic component of a circulating current according to an embodiment of the present invention, are shown in FIG. 10.

Figure 6:
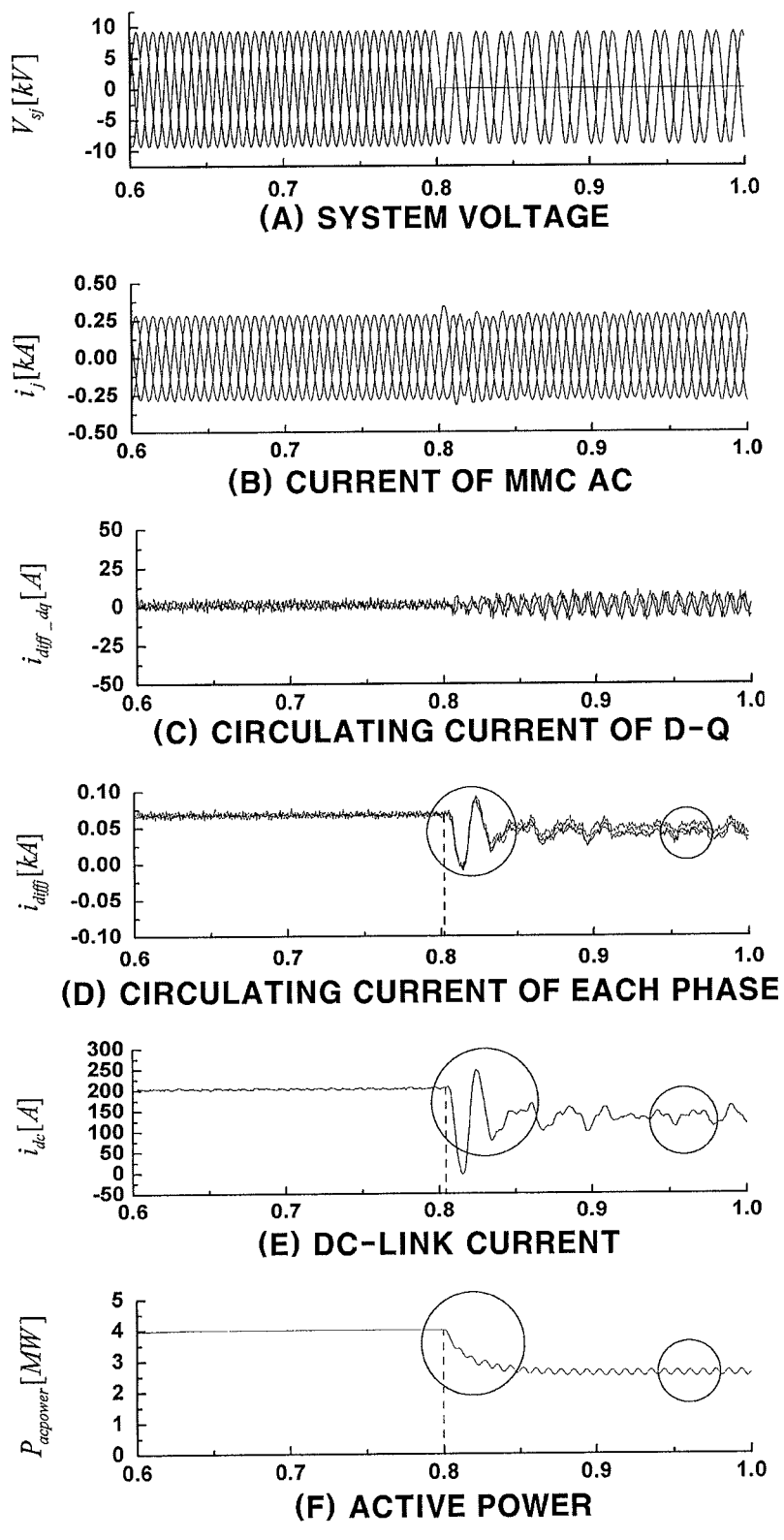
FIG. 6 is a graph illustrating control characteristics of an HVDC multilevel converter including circulating current suppression characteristics according to a typical Qingrui method.

Under a condition of FIG. 10A in which one phase among 3-phase system voltage is grounded, compared to FIGS. 6 and 10, the related art circulating current suppression method by Qingrui shows the circulating current control characteristics of transient state characteristics in which the circulating current oscillates up and down on each phase (see FIG. 6D), but the present invention shows excellent response and convergence of the circulating current (indicated as a circle in FIG. 10D).

Also, while the related art Qingrui method is not good in the transient state characteristics of the DC-link current, and includes a harmonic component even in the stationary state (see FIG. 6E), the present invention shows significant improvement in both transient state characteristics and stationary state characteristics as shown in FIG. 10E showing the current characteristics of the DC_link.

Also, in terms of active power control, while the related art method shows that the active power has a harmonic component (see FIG. 6F), the present invention shows that the harmonic component is completely removed even from the active power.

Accordingly, regardless of 3-phase balance or 3-phase unbalance application of the system power, the present invention can completely remove the harmonic component of the circulating current, and simultaneously, can completely remove the harmonic component of the active power.

TABLE 1

| Parameter | Equivalent Integer |
| --- | --- |
| Active Power | 4 MW |
| Reactive Power | 0.8 MVar |
| AC System Voltage | 11500 V |
| AC System Inductance | 19.35 mH |
| DC Bus Voltage | 20 kV |
| DC Resistance | 0.1 Ohm |
| Number of SMs per arm | 8 |
| SM Capacitance | 0.001 F |
| SM Capacitor Voltage | 2500 V |
| Arm Inductance | 0.03 H |
| Carrier Frequency | 500 Hz |

A method for suppressing a circulating current of a modular multi-level convert for high voltage direct-current transmission has the following advantages.

1) Since the AC component of the circulating current generated in the modular multilevel converter for HVDC can be completed removed, the current specifications of a capacitor and IGBT applied to the modular multilevel converter can be reduced, increasing the price competitiveness.

2) The sub-module voltage amplitude of the modular multilevel converter can be reduced.

3) The waveform of the upper or lower arm current of the multilevel converter can be improved.

4) The efficiency of the converter can be improved.

5) The waveform of a current flowing in a high voltage DC line can be significantly improved.

6) Even under an unbalanced voltage condition, control can be performed such that harmonics are not included in an active power component of the AC system side connected to the HVDC system.

7) A modular multilevel converter having all of the above-mentioned features can be developed.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for suppressing circulating currents of a, b, c phases in a modular multi-level converter for a high voltage direction-current (HVDC) transmission system converting an alternating current (AC) into a direct current (DC) and vice versa, transmitting energy using a DC cable, and having the modular multilevel converter generating a high voltage source by stacking a plurality of sub-modules in series, the method comprising:

receiving circulating currents in each of a phase, b phase, and c phase in an 3 phase stationary reference frame, a DC current $i_{dc}$ flowing in a DC cable, a current reference value $i^*_{dc}$ of a DC component that needs to flow in the DC cable;

controlling AC components of the circulating currents in each of a phase, b phase, and c phase to become zero; and outputting a compensation value $V^*_{diffj}$ for suppressing a harmonic component of the circulating current, wherein the controlling of AC components of the circulating currents comprises:

calculating the current reference value $i^*_{dc}$ of the DC component that needs to flow in the DC cable by equation of $i^*_{dc}=P_{acpower}/V_{dc}$ (with $P_{acpower}$:known);

extracting a current $i^*_{dc}-i_{dc}$ of an AC harmonic component flowing in a DC link terminal by eliminating the DC current $i_{dc}$ flowing in the DC link terminal from the current reference value $i^*_{dc}$ of the DC component; and controlling the current $i^*_{dc}-i_{dc}$ of an AC harmonic component flowing in a DC link terminal to become zero, wherein the controlling of AC components of the circulating currents further comprises:

calculating AC components $i_z$ of the circulating currents $i_{diffj}$ by eliminating an ⅓ of the DC current $i_{dc}$ from the circulating currents $i_{diffj}$; and removing the AC components $i_{zj}$ of the circulating currents $i_{diffj}$, wherein the removing of the AC components $i_{zj}$ is performed in the 3-phase stationary reference frame by Equation $V_{j\_diffcrtripple\_rej\_ref}=PIR[i^*_{zj}-i_{zj}]$ (with $i^*_{zj}=0$, j=a, b, c) by applying a Proportional-Integral and Resonant (PIR) controller having an infinite gain at a frequency of $\pm 2\omega_0$ when an angular frequency $\omega_0$ equals to $2\pi f_0$ at a power system frequency of $f_0$, here, $$PIR[\text{error}] = \left\{K_P + \frac{K_i}{s} + \frac{2K_r s}{s^2 + (2\omega_0)^2}\right\} \times \text{error}$$

a, b, c: division factors for dividing 3-phase system voltage into a-phase, b-phase, c-phase $P_{acpower}$: converted AC power by modular multi-level converter $V_{dc}$: DC cable voltage (DC_link voltage) of HVDC, $i^*_{zj}$: AC component reference value among components of circulating current $V_{j\_diffcrtripple\_rej\_ref}$: output value after controller for suppressing AC component of circulating current $K_p$, $K_i$, $K_r$: proportional gain, integral gain, proportional gain of resonant controller error: signal input including error information s: d( )/dt in Laplace transform.

2. The method of claim 1 wherein the current $i^*_{dc}-i_{dc}$ of the AC harmonic component becomes zero by allowing the extracted current $i^*_{dc}-i_{dc}$ of the AC harmonic components to be an input value of the Proportional-Integral and Resonant controller and controlling the Proportional-Integral and Resonant controller having a resonant point at a frequency of $+2\omega_0$.

3. The method of claim 1, wherein the outputting of the compensation value $V^*_{diffj}$ for suppressing the harmonic component of the circulating current comprises generating voltage reference values $V^*_{diffa}$, $V^*_{diffb}$, $V^*_{diffc}$ of the circulating current suppression component by adding up an output value $V_{j\_diffcrtripple\_rej\_ref}$ of the circulating current of an AC component suppression controller and an output value $V_{dccrtripple\_rej\_ref}$ of the DC cable current of the AC component suppression controller.

4. The method of claim 3, wherein the outputting of the compensation value $V^*_{diffj}$ for suppressing the harmonic component of the circulating currents comprises calculating voltage reference values $V_{pj}$, $V_{nj}$ of an upper arm and a lower arm of the modular multilevel converter by Equations $$V_{pj} = \frac{V_{dc}}{2} - V_{j-ref} - V^*_{diffj} \text{ (with } j = a, b, c) \text{ and}$$

$$V_{nj} = \frac{V_{dc}}{2} + V_{j-ref} - V^*_{diffj} \text{ (with } j = a, b, c)$$

so as to be linked with a control algorithm of the modular multilevel converter, here, $V_{j-ref}$: controller output for controlling reactive power and active power (or DC_link voltage control) of multilevel converter $V_{dc}$: DC cable voltage (DC_link voltage) of HVDC.

5. The method of claim 1, wherein when the circulating currents $i_{diffa}$, $i_{diffb}$, $i_{diffc}$ at the 3-phase stationary reference frame are expressed in a 2-phase stationary reference frame ($\alpha$-$\beta$ frame), a compensation value $V_{\alpha\_diffcrtripple\_rej\_ref}$ for suppressing an $\alpha$-axis AC harmonic component of the circulating current is calculated by an equation $V_{\alpha\_diffcrtripple\_rej\_ref}=PIR[i^*_{diff\alpha}-i_{diff\alpha}]$, and a compensation value $V_{\beta\_diffcrtripple\_rej\_ref}$ for suppressing a $\beta$-axis AC harmonic component of the circulating current is calculated by an equation $V_{\beta\_diffcrtripple\_rej\_ref}=PIR[i^*_{diff\beta}-i_{diff\beta}]$, here, $i_{diff\alpha}$: $\alpha$-axis component $i_{diff\beta}$: $\beta$-axis component $i^*_{diff\alpha}$: reference value with respect to $\alpha$-axis circulating current $i^*_{diff\beta}$: reference value with respect to $\beta$-axis circulating current.

6. The method of claim 1, wherein when the circulating currents $i_{diffa}$, $i_{diffb}$, $i_{diffc}$ at the 3-phase stationary reference frame are expressed in a d-q rotating coordinate system and components of the circulating currents of a, b, c phases are divided into positive sequence components $i^p_{diffd}$, $i^p_{diffq}$, negative sequence components $i^n_{diffd}$, $i^n_{diffq}$, and a zero sequence component $i^0_{diff}$, wherein the components $i^p_{diffd}$, $i^p_{diffq}$, $i^n_{diffd}$, $i^n_{diffq}$, $i^0_{diff}$ of the circulating currents are simultaneously removed.

7. The method of claim 6, wherein:
a reference voltage $V^p_{diffd}$ for suppressing a d-axis positive sequence component circulating current $i^p_{diffd}$ is calculated by an equation $$V_{diffd}^p = PI[-i_{diffd}^p];$$

a reference voltage $V^p_{diffq}$ for suppressing a q-axis positive sequence component circulating current $i^p_{diffq}$ is calculated by an equation $$V_{diffq}^p = PI[-i_{diffq}^p];$$

a reference voltage $V^n_{diffd}$ for suppressing a d-axis negative sequence component circulating current $i^n_{diffd}$ is calculated by an equation $$V_{diffd}^n = PI[-i_{diffd}^n];$$

a reference voltage $V^n_{diffq}$ for suppressing a q-axis negative sequence component circulating current $i^n_{diffq}$ is calculated by an equation $$V_{diffq}^n = PI[-i_{diffq}^n];$$

and a reference voltage $V^0_{diff}$ for suppressing a zero sequence component circulating current $i^0_{diff}$ is calculated by an equation $$V_{diff}^0 = PI[-i_{diff}^0]$$

here, $$PI[\text{error}] = \left\{ K_p + \frac{K_i}{s} \right\} \times \text{error}.$$

8. A method for suppressing circulating currents in a modular multi-level converter for a high voltage direction-current (HVDC) transmission system converting an alternating current (AC) into a direct current (DC) and vice versa, transmitting energy using a DC cable, and having a modular multilevel converter generating a high voltage source by stacking a plurality of sub-modules in series, the method comprising:
receiving circulating currents in each of a phase, b phase, and c phase in an abc 3-phase stationary reference frame, a DC current $i_{dc}$ flowing in a DC cable, a current reference value $i^*_{dc}$ of a DC component that needs to flow in the DC cable;
controlling AC components of the circulating currents in each of a phase, b phase, and c phase to become zero; and
outputting a compensation value $V^*_{diff}$ for suppressing a harmonic component of the circulating current,
wherein the controlling of AC components of the circulating currents comprises:
calculating the current reference value $i^*_{dc}$ of the DC component that needs to flow in the DC cable by equation of $i^*_{dc} = P_{acpower}/V_{dc}$ (with $P_{acpower}$:known),
wherein the controlling of AC components of the circulating currents further comprises:
calculating AC components $i_{zj}$ of the circulating currents $i_{diffj}$ by eliminating an ⅓ of the current reference value $i^*_{dc}$ of the DC component from the circulating currents $i_{diffj}$; and
removing the AC components $i_{zj}$ of the circulating currents $i_{diffj}$;
wherein the removing of the AC components $i_{zj}$ is performed in the 3-phase stationary reference frame by Equation $V_{j\_diffctripple\_rej\_ref} = PIR[i^*_{zj} - i_{zj}]$ (with $i^*_{zj} = 0$, j=a, b, c) by applying a Proportional-Integral and Resonant (PIR) having an infinite gain at a frequency of $\pm 2\omega_0$ when an angular frequency $\omega_0$ equals to $2\pi f_0$ at a power system frequency of $f_0$,
here, $$PIR[\text{error}] = \left\{ K_p + \frac{K_i}{s} + \frac{2K_r s}{s^2 + (2\omega_0)^2} \right\} \times \text{error}$$

a, b, c: division factors for dividing 3-phase system voltage into a-phase, b-phase, c-phase
$P_{acpower}$: converted AC power by modular multi-level converter
$V_{dc}$: DC cable voltage (DC_link voltage) of HVDC,
$i^*_{zj}$: AC component reference value among components of circulating current
$V_{j\_diffcrtripple\_rej\_ref}$: output value after controller for suppressing AC component of circulating current
$K_p$, $K_i$, $K_r$: proportional gain, integral gain, proportional gain of resonant controller
error: signal input including error information
s: d( )/dt in Laplace transform.

* * * * *